United States Patent
Choi et al.

(10) Patent No.: US 12,244,362 B2
(45) Date of Patent: Mar. 4, 2025

(54) POLARITY SWITCHING POWER LINE COMMUNICATION

(71) Applicant: TINYPOWERS CO., LTD., Anyang-si (KR)

(72) Inventors: Jae Boo Choi, Anyang-si (KR); Changjoon Choi, Anyang-si (KR)

( * ) Notice: Subject to any disclaimer, the term of this patent is extended or adjusted under 35 U.S.C. 154(b) by 365 days.

(21) Appl. No.: 17/635,027

(22) PCT Filed: Aug. 10, 2020

(86) PCT No.: PCT/KR2020/010514
§ 371 (c)(1),
(2) Date: Feb. 14, 2022

(87) PCT Pub. No.: WO2021/033976
PCT Pub. Date: Feb. 25, 2021

(65) Prior Publication Data
US 2022/0294491 A1    Sep. 15, 2022

(30) Foreign Application Priority Data
Aug. 16, 2019 (KR) .......... 10-2019-0100619

(51) Int. Cl.
*H04B 3/46* (2015.01)
*H04B 3/54* (2006.01)

(52) U.S. Cl.
CPC ......... *H04B 3/46* (2013.01); *H04B 3/54* (2013.01); *H04B 2203/542* (2013.01)

(58) Field of Classification Search
CPC ....... H04B 3/46; H04B 3/54; H04B 2203/542
See application file for complete search history.

(56) References Cited

U.S. PATENT DOCUMENTS 8,823,499 B2 * 9/2014 Franco ............... H04B 3/56
                                                    340/12.3
9,391,452 B1 * 7/2016 Cousinard ......... H02J 13/00017
(Continued)

FOREIGN PATENT DOCUMENTS

| KR | 10-2010-0053988 A | 5/2010 |
|---|---|---|
| KR | 10-2015-0077386 A | 7/2015 |
| KR | 10-2019-0041089 A | 4/2019 |

*Primary Examiner* — Justin Y Lee
(74) *Attorney, Agent, or Firm* — KORUS Patent, LLC; Seong Il Jeong

(57) ABSTRACT

Instead of the method of performing the power disconnection in the existing phase angle control AC power line communication, using relays or various power semiconductor devices, if communication is executed through data mapping on a pattern where polarity switching (in the case of AC, phase-shifting by 180°) occurs at a differential voltage level of a power line, no power disconnection occurs and high voltage interval is utilized so that the power line communication is strongly resistant to external noise and provides high communication speed, while transmitting several bits in one period of AC voltage waveform. This solves the disadvantages the existing classical condenser coupling type power line communication and the phase angle control AC power line communication for long distance have had. Even though the power line communication is utilized for DC power line communication, many advantages are obtained and high power transmission efficiency is achieved through the relays.

5 Claims, 8 Drawing Sheets

Example of configuration of reception side circuit

(56) References Cited

U.S. PATENT DOCUMENTS

| | | | | |
|---|---|---|---|---|
| 9,559,752 | B1* | 1/2017 | Krishnamachari | H04B 3/56 |
| 9,634,723 | B1* | 4/2017 | Lawal | H04L 25/0272 |
| 10,644,611 | B2* | 5/2020 | Wang | H02M 7/483 |
| 2007/0222578 | A1* | 9/2007 | Iwamura | G08B 25/06 |
| | | | | 340/538 |
| 2013/0265000 | A1* | 10/2013 | Beaury | H02J 7/0042 |
| | | | | 320/137 |
| 2016/0072551 | A1* | 3/2016 | van Casteren | H04L 27/04 |
| | | | | 375/238 |
| 2017/0111086 | A1* | 4/2017 | Choi | H04B 3/54 |
| 2017/0302107 | A1* | 10/2017 | Saussele | H02J 7/35 |
| 2020/0304172 | A1* | 9/2020 | Yano | B60R 16/023 |

\* cited by examiner

Polarity switching occurrence

Polarity switching voltage waveform

Transmission side switching unit for polarity switching as DPDT(Dual Pole Dual Throw) relay SSR (Solid-State Relay) and PhotoTriac Transmission side switching unit for AC polarity switching using four SSRs In the case of outputting polarity switching signal to ripple current In the case of outputting polarity switching signal to AC Polarity switching output shape according to driving way of H-bridge circuit

FIG. 6

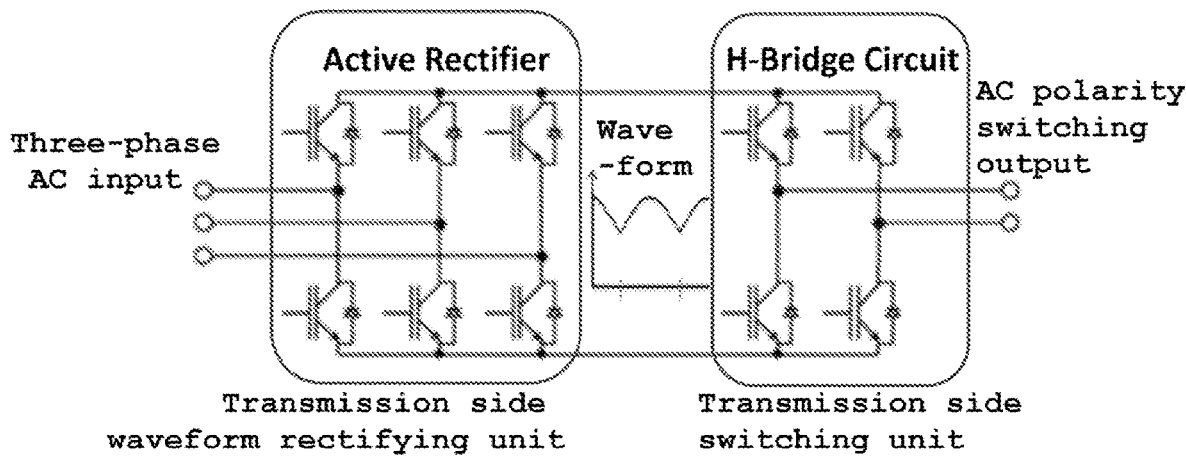

Example where transmission side waveform rectifying unit is configured to have active rectifier with IGBTs and transmission side switching unit to have H-bridge circuit

FIG. 7

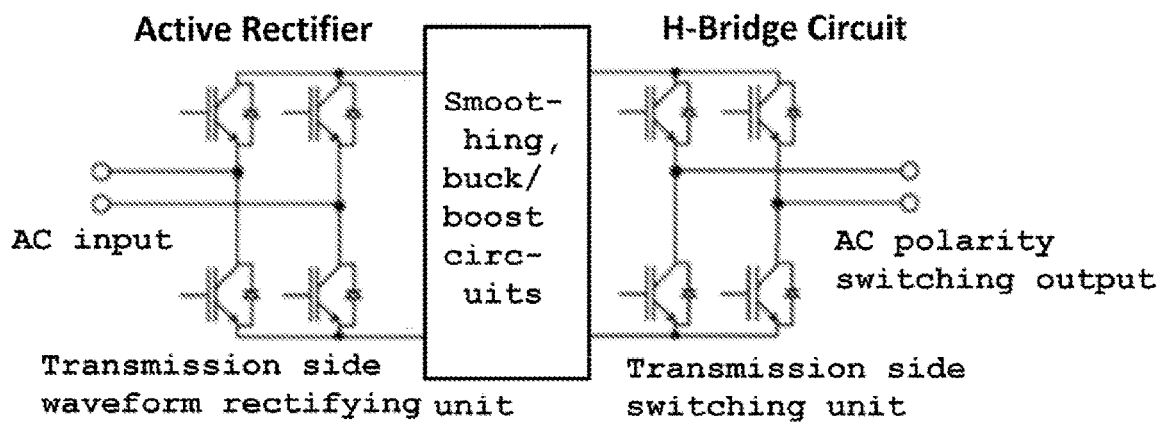

Example where smoothing circuit and voltage conversion circuit are added between active rectifier with IGBTs as transmission side waveform rectifying unit and H-bridge circuit as transmission side switching unit Example of transmission side circuit for polarity switching
communication at high AC power voltage Example of configuration of reception side circuit Example of configuration of reception side circuit
for LED light control Example of circuit for sensing polarity switching of AC power on reception side

POLARITY SWITCHING POWER LINE COMMUNICATION

TECHNICAL FIELD

A power line communication system, which simultaneously transmits power, data, control command, and information to a remote place using a single power line, is classified into an alternating current (AC) power line communication system and a direct current (DC) power line communication system according to transmission power. After AC is transmitted, it is converted into DC on a reception side, or vice versa. Accordingly, the classification is determined according to the waveform of the voltage applied to the power line, not according to the type of power used at a final load on the reception side after the transmission of the power.

A classical condenser coupling type AC power line communication system, which modulates an Radio frequency (RF) carrier wave to communication information and performs coupling to 50/60 Hz AC power through a condenser, is widely used as a power line communication system, and further, there is a phase angle control AC power line communication system that disconnects the potential around zero-crossing point of the voltage waveform of some of the AC power through a semiconductor switching device and performs data mapping on a waveform-modified pattern.

The DC power line communication system is sub-classified into a classical condenser coupling DC power line communication (for example, Power over Coaxial (PoC)) system that modulates an RF carrier wave on smooth DC to a transmission signal and performs coupling, a system for executing data mapping on a pattern where a voltage level of a DC power line is varied, a system for executing data mapping on a pattern where voltages of two wires are relatively varied high and low, and a Power over Ethernet (PoE) for executing power transmission using a spare communication line.

The present invention relates to a power line communication system that is capable of being configured to have a simpler circuit than the circuit in the existing power line communication system and capable of modifying the AC voltage waveform of a power line, while adopting no method of modulating a carrier wave and coupling the modulated carrier wave, irrespective of zero-crossing point of AC or through intentional avoidance around the zero-crossing point, thereby removing the problems the existing phase angle control power line communication system has had, that is, the occurrence of energy disconnection, unstable communication due to low signal level, and low communication speed.

BACKGROUND ART

The classical condenser coupling type AC power line communication system modulates a high frequency RF carrier wave greater than tens of kHz according to communication information and performs coupling to 50/60 Hz AC power through a condenser or RF transformer to thus superimpose them. Various modulation and demodulation technologies such as Orthogonal Frequency-division Multiplexing (OFDM) may be applied to the carrier wave. A representative standard for communication devices is IEEE 1901, and in addition thereto, there are a number of patents such as US 2013/0101057 A1 (Apr. 25, 2013), U.S. Pat. No. 7,307,511 B2 (Dec. 11, 2017), etc.

The classical condenser coupling type AC power line communication system makes use of the high frequency of modulated signal to thus transmit a lot of data at a high transmission speed, but so as to prevent the modulated carrier wave from being propagated up to an unnecessary position, it requires a high-priced blocking filter. Besides, it needs a high specification modem for high frequency modulation and demodulation.

Above all, the classical condenser coupling type AC power line communication system has a lower degree of communication stability due to an impedance matching problem on the power line when compared with wireless RF communication having air as a transmission medium, and to solve the problem, strictness and high cost are needed in the installation and operation of the power line, thereby causing low marketability and stopping spreading in technology.

The phase angle control AC power line communication system switches the voltage of the AC around the zero-crossing point by means of the semiconductor switch device, instead of the coupling with the modulated carrier wave, and if the power is disconnected, the current flows to the impedance between lines and is descended to 0 V potential according to the circuit characteristics after the disconnection from the potential just before the disconnection, thereby transmitting data to the changed pattern. So as to reduce the energy disconnection, the zero-crossing point of the AC waveform has to be accurately detected in advance, and further, the low voltage phase interval around the zero-crossing point is set as a signal phase interval, so that only on the signal phase interval, the power disconnection switching is performed. Representative examples of the phase angle control AC power line communication system are disclosed in Korean Patent No. 10-132604 B1 (Oct. 31, 2013) and No. 10-1206386 B1 (Nov. 23, 2012).

In the case where the voltage of the low voltage phase interval around the zero-crossing point is utilized as a signal level to perform the data mapping, the phase interval around the zero-crossing point of an AC sine wave is low in voltage and very high in regulation (inclination) as a derivative thereof, so that disadvantageously, if the signal phase interval around the zero-crossing point is narrowly set, the zero-crossing point has to be detected very accurately.

Since the narrowly set signal phase interval around the zero-crossing point is small in the signal range represented as a sine wave voltage, it may be easily influenced by external noise and may be great in inclination of waveform, so that an error at the zero-crossing point greatly changes a signal value, thereby requiring a high degree of accuracy in detecting the zero-crossing point.

To enhance communication reliability with respect to the external noise, the signal phase interval may be enlarged around the zero-crossing point so that the signal range is increased, but at the time when a switch is turned off, the interval at which the power transmission supplied to a load is cut off may be increased, and even in the case where the switch is already turned off, the potential is not converged to 0 V rapidly according to the circuit characteristics on the side of the load disconnected, thereby causing the occurrence of communication error.

Referring contrarily to the DC power line communication system, a technology such as a full-2way remote control system as disclosed from Panasonic electric works Co. Ltd. of Japan is suggested as one of known technologies, but the conventional technology is used not for load power transmission, but for driving power transmission for a communication reception side, so as to transmit low power less than or equal to 24 V 500 mA (12 W) as a limit level of an integrated circuit driven. The conventional technology increases the voltage and current of existing differential communication electrical signal to a given level and transmits the power to the reception side, but the object of the conventional technology is different from that of general power line communication that transmits final power used by an electrical load using large power.

A technology where data is mapped on a pattern that switches polarities defined as relatively heights between the potentials of two electric wires is disclosed in Korean Patent No. 10-1745779 (Jun. 2, 2017), but the conventional technology for DC power transmission is different from the power line communication system according to the present invention for AC power transmission. Further, the conventional technology is more complicated in configuration and lower in transmission efficiency when compared with the power line communication system according to the present invention. Besides, the conventional technology is not adequate for load power control communication in the case where the AC power is directly used for a load, like an AC direct type LED light. In specific, since the conventional technology does not use commercial AC power directly, a DC power supply for converting AC into DC such as a power adapter or Switched Mode Power Supply (SMPS) has to be located on a transmission side, which undesirably occupies a large space, so that it is hard to locate a transmission device of the power line communication system inside a narrow space like an electricity distribution board on which an earth leakage breaker and an over-current circuit breaker are disposed in a house. Further, since the power supply like SMPS has to have an electrolytic condenser built therein, malfunctions may occur frequently due to the leakage of electrolyte, and since air circulation is needed due to heating, a fan from which noise is generated has to be mounted and a convention current space with a given size is needed, thereby causing some problems in putting into practice.

DISCLOSURE

Technical Problem

The existing classical condenser coupling type AC power line communication system advantageously has high speed communication but disadvantageously has the necessity of the blocking filter for blocking the introduction of the modulated carrier wave into the unnecessary line and the costs for the strict construction and maintenance of the line for impendence matching so as to ensure the stability of communication. Contrarily, the phase angle control AC power line communication system is proposed for the purpose of low speed control communication, but since data is mapped by one bit on the phase interval around the zero-crossing point of the AC, low communication speed of about 120 bps and power disconnection may occur in the case of 60 Hz frequency power. So as to avoid the power disconnection, further, a low voltage signal level becomes exist around the zero-crossing point, which undesirably causes a weakness with respect to external noise.

The present invention is not for the purpose of high speed communication like multimedia streaming information, and accordingly, the present invention capable of removing the disadvantages the existing phase angle control AC power line communication system has had will be explained below, without any discussion on the classical condenser coupling type AC power line communication system.

The existing phase angle control AC power line communication system detects the zero-crossing point of the AC voltage waveform, switches the power on the signal phase interval around the zero-crossing point by means of an external switch, modifies the voltage waveform, and maps data on the pattern. For example, if the AC sine waveform is normal on the signal phase interval around the zero-crossing point, data becomes 0 and power is disconnected through a switch, and if an interval at which the voltage is converged to 0 V is increased, data is mapped on 1, so that synchronous communication is executed by one bit per zero-crossing point. Since the voltage is not high on the signal phase interval around the zero-crossing point, the signal is unstable, and whenever reception sides are added in a multi-drop bus structure, the reception sides are arranged in parallel with each other, so that the whole line impedance becomes low, but if the number of reception sides connected is small, the line impedance becomes high. Further, a temporal change where the potential at the interval disconnected by the switch, that is, at the signal phase interval is unstably converged to 0 V may occur greatly, and since the line impedance is more than a given size, noise may be easily introduced from an interior or exterior that switches a load, thereby undesirably causing unstable communication.

Since the voltage of the AC power has a sine wave, the value around the zero-crossing point is very low and regulation (inclination) as a derivative thereof is very high. Accordingly, values of signal voltages have a big difference according to a little phase difference around the zero-crossing point. Therefore, the zero-crossing point has to be detected very accurately, and since the voltage value around the zero-crossing point is low, the signal is influenced by the noise introduced from the outside to undesirably cause unstable communication.

To solve such problems, the range of the signal phase interval may be expanded to increase the voltage range of the signal, but in this case, the power transmission on the large interval does not occur. As the phase angle control AC power line communication system is the synchronous communication system that is synchronized with the zero-crossing point and transmits data by one bit, it is limited to the frequency of the commercial AC power, thereby disadvantageously causing low communication speed.

The present invention is different from the classical condenser coupling type AC power line communication system, and an object of the present invention is to solve the problems the existing phase angle control power line communication system has had. In specific, an object of the present invention is to provide a power line communication system that is capable of being simple in configuration, requiring a low cost, and having high reliability and capable of solving, if a power source is AC, the low communication speed problem of about 120 bps due to the use of the phase interval around the zero-crossing point for the communication in the existing phase angle control power line communication system.

If even low communication speed does not matter, the present invention can be simply configured to use a relay for a switching device and can achieve high communication speed in a semiconductor switching device capable of being controlled at a high speed. In specific, even though the power source is DC, the relay can be very easily adopted.

Accordingly, the present invention is capable of executing power transmission, data transmission, and load use control to a power load used connected to the reception side, such as a light, motor, actuator, home appliance, electric appliance, information device, and the like, very reliably, economically, at high communication speed, without any power loss, unlike the existing system.

Technical Solution

A transmission side has a transmission side power source input stage connected to a DC or AC power source and a transmission side output stage connected to a connection line. If a voltage between two terminals of the transmission side output stage is a DC power source, it is kept to a given smooth value, and if it is an AC power source, a positive voltage is changed to a negative voltage every the phase of 180° in frequency periods of 50/60 Hz. If the positive voltage is defined as a positive polarity and the negative voltage as a negative polarity, the AC power source is repeatedly changed from the positive polarity to the negative polarity in the frequency periods of 50/60 Hz.

In the case where the power source is the DC power source, if the polarities are defined in the same manner as above, the positive or negative polarity is continuously kept. If an appropriate switching means is disposed between the transmission side power source input stage and the transmission side output stage and then controlled, the potentials of both terminals of the transmission side output stage are changed in polarity, and in the case where the power source is the AC power source, the phase of the AC waveform of the sine wave is shifted by 180°. Like this, the polarities are switched, and in the case of the AC, the phase is shifted by 180°, which are defined as polarity switching (See FIG. 1).

A means for executing polarity switching on the transmission side is defined as a transmission side switching unit. The transmission side switching unit is configured to have an H-bridge circuit constituted of a bidirectional switching device such as a solid state relay (SSR), a Triac, or two Metal Oxide Semiconductor Field Effect Transistors (MOSFETs) connected through a cascade, constituted of a single relay with a Dual Pole Dual Throw (DPDT) switch, or constituted of an H-bridge circuit with a unidirectional switching device such as a transistor, a MOSFET, Silicon Controlled Rectifier (SCR), or Insulated Gate Bipolar transistor (IGBT). In specific, the H-bridge circuit may be constituted of two half bridges, four P-channel or N-channel devices, or a combination of the P-channel and N-channel devices. Various methods for insulating the gate of the switching device and driving the switching device may be provided.

If the power source is the DC, the unidirectional switching device is a DC switching device. The bidirectional switching device, the unidirectional switching device, and the DC switching device are not limited as mentioned above, but they may include all switching means such as relays or power semiconductor devices in accordance with the flowing direction of the current.

In the case where the H-bridge circuit is constituted of the unidirectional switching device and the power source is the AC, if it is desired to use the AC as the power source of the H-bridge circuit, the H-bridge circuit does not operate in the phase interval of the negative polarity, and accordingly, one side input terminal potential of the transmission side switching unit is always equal to or greater than the other and thus connected to the positive power source terminal, so that the transmission side switching unit may operate normally. A component having a rectifying function through a diode so as to allow one terminal potential to be higher than the other is defined as a transmission side waveform rectifying unit. In the case of the negative polarity phase interval of the AC, the transmission side waveform rectifying unit becomes a rectifying circuit that reverses the voltage to produce rectified ripple current. A variety of rectifying circuits such as a bridge diode circuit, an active rectifier with a small power loss, and the like may be adopted.

In the case of the transmission side switching unit using the bidirectional switching device, the AC power source and the switching means may be directly connected to each other, but in the case of the transmission side switching unit using the unidirectional switching device, the positive power source terminal of the power supply of the transmission side switching unit has to be always higher in potential than the negative terminal to ensure the positive polarity, so that after the potential is rectified in the negative polarity phase interval and reversed, the potential is connected to the transmission side switching unit. Desirably, if the bidirectional switching device such as dual MOSFET cascade is adopted, advantageously, voltage drop is small and power transmission efficiency is high.

If the switching is executed through the transmission side switching unit at an appropriate time point under the control of a microcontroller or dedicated circuit logic, the polarity switching for the output of the transmission side switching unit is executed. That is, the positive voltage between two wires through the polarity switching is changed to the negative voltage, or vice versa. In the case of the AC, the waveform whose phase is shifted by 180° is produced. The microcontroller or dedicated circuit logic of the transmission side that controls the transmission side switching unit to execute the polarity switching is defined as a transmission side switching control unit, and through the output of the transmission side switching control unit, the transmission side switching unit operates to execute the polarity switching.

At the temporal pattern of the polarity switching, reception side ID of communication and communication data are mapped and transmitted, and on the reception side, the polarity switching pattern is analyzed. If the transmitted ID corresponds to the reception side ID, the decoded communication data is utilized for load control.

If the power source is AC and the polarity switching is generated around the zero-crossing point, the zero-crossing point is the phase interval where the signal size is low on the sine wave, so that it is hard to distinguish the level of signal and the signal level is weak in noise. Accordingly, there is a need to generate the polarity switching pattern, while avoiding the zero-crossing point. A transmission side phase detecting unit serves to avoid the zero-crossing point, find a peak value phase time point, or to recognize a specific phase time point with a given temporal margin at the zero-crossing point, and if the polarity switching pattern is generated in the state where the zero-crossing point is avoided, communication strongly resistant to external noise can be obtained through a high signal level.

Contrarily, in the case where the polarity switching is executed through a device having relatively long switching time, energy disconnection may be extended, and in this case, if the switching is executed around the zero-crossing point, energy disconnection may be reduced and the switch of the relay may be protected. In this case, first, the zero-crossing point is detected, and next, the polarity switching is executed around the zero-crossing point.

The transmission side switching control unit of the transmission side controls the transmission side switching unit to produce the polarity switching pattern corresponding to the target reception side ID and the transmission data according to a protocol, and accordingly, the waveform is transmitted to the reception side connected thereto in the multi-drop bus or tree structure through the connection line. The reception side monitors the potential signal value of the connection line through a reception side potential monitoring unit, and a reception side analyzing unit extracts and analyses the polarity switching pattern from the result of the reception side potential monitoring unit and decodes the ID and the transmission data. If the extracted ID corresponds to the reception side ID, the corresponding reception side recognizes that the transmission data is transmitted thereto, and the transmission data is utilized as data or used to control a load.

If the power source is AC, 50/60 Hz periodical AC voltage waveform is transmitted to the reception side, and accordingly, a signal voltage can be expected after a given period of time. Next, the expected signal voltage is compared with the AC voltage of the current connection line, and if a difference therebetween occurs, it is determined that the transmission side switching unit is operated. If the reception side potential monitoring unit executes such determination according to the flow of time, the switching pattern according to the time can be recognized from the result of the reception side potential monitoring unit, and the reception side analyzing unit recognizes the switching pattern and decodes the reception side ID and transmission data with reference to the protocol.

Like this, as an example of a method for comparing the expected signal value of the specific phase time point with the signal voltage of the current connection line, a Phase Locked Loop (PLL) is used to produce an imaginary waveform whose phase corresponds to the specific phase. The PLL may be configured to have a dedicated IC, and otherwise, the PLL may be provided with a program of the microcontroller.

Advantageous Effects

When compared with the existing classical condenser coupling type AC power line communication system, the polarity switching power line communication system according to the present invention can obtain the power line communication with high reliability, while needing no blocking filter, no high-priced modem for modulation of carrier waves with an RF band, and no costs for strict wiring construction and maintenance for line impedance matching.

When compared with the existing phase angle control AC power line communication using no condenser coupling, there is no need to accurately find and use the zero-crossing point, a low communication speed problem may be solved as a communication speed is synchronized with the generation of the zero-crossing point, and a weakness in external noise, which occurs as a signal level of a sine wave is very low around the zero-crossing point, may disappear.

The zero-crossing point is continuously generated two times in a period of 50/60 Hz, and the external noise around the zero-crossing point has bad influences on the communication reliability. However, the present invention can solve the problems. The detection of the zero-crossing point can avoid the zero-crossing point and select a phase interval having a given margin, that is, a high voltage signal phase interval to generate a data packet having a big signal range through the polarity switching, thereby providing highly reliable communication with respect to the external noise at a very low cost.

So as to minimize power transmission disconnection, the existing phase angle control AC power line communication accurately finds the zero-crossing point, controls the voltage value around the zero-crossing point by means of a switch, and converges the voltage value to 0 V, but according to the present invention, if the transmission side switching unit executes the polarity switching by means of the H-bridge circuit, the power disconnection does not occur so that the polarity switching is repeatedly executed at any phase interval to thus perform data mapping. The existing method is synchronous communication that is synchronized with the AC waveform where the data mapping is executed on only two zero-crossing points in one AC waveform period, but according to the present invention, the polarity switching is repeatedly executed at any phase interval except the low voltage interval around the zero-crossing position. If the transmission data is mapped on the repeated pattern several times in one period, the communication whose transmission speed is very fast can be executed.

When compared with the DC and AC power line communication technology using the existing H-bridge circuit, the AC power line communication technology transmits the AC power, still uses the AC load such as an AC direct type LED, and solves the problem occurring due to the bulky DC power supply producing the DC power source from the commercial AC power source so that the transmission side of the power line communication system cannot be disposed at a small space like a household electricity distribution board. The biggest difference is that the transmission power is the DC and AC, which is deviated from the object of the present invention.

Further, the transmission side switching unit having good power transmission efficiency may be configured simply to have one relay even at a low communication speed and through sufficient application. Even in the case where the power source is DC, the transmission side switching unit is easily configured in the above manner.

DESCRIPTION OF DRAWINGS

FIGS. 5A and 5B show the voltage waveforms of the transmission side output stage if a power source is AC and the transmission side switching unit executes six-time polarity switching per one period two times, wherein FIG. 5A shows polarity switching signals outputted to ripple current and FIG. 5B shows polarity switching signals outputted to AC.

FIG. 6 shows an example where if a power source is three-phase AC, a transmission side waveform rectifying unit is connected to the transmission side switching unit, wherein an IGBT is used as a semiconductor switching device, and the transmission side waveform rectifying unit uses six IGBT devices, while the transmission side switching unit is using four IGBT devices, so that they generate the outputs with polarity switching information with respect to the three-phase AC input.

FIG. 7 shows an example where if a power source is a single phase AC power source, the polarity switching output of the AC passes through the transmission side waveform rectifying unit as an active rectifier, passes through a smoothing circuit or a buck/boost power supply circuit for bucking or boosting the voltage, and is generated through the transmission side switching unit configured to have the H-bridge.

BEST MODE FOR INVENTION

Figure 1:
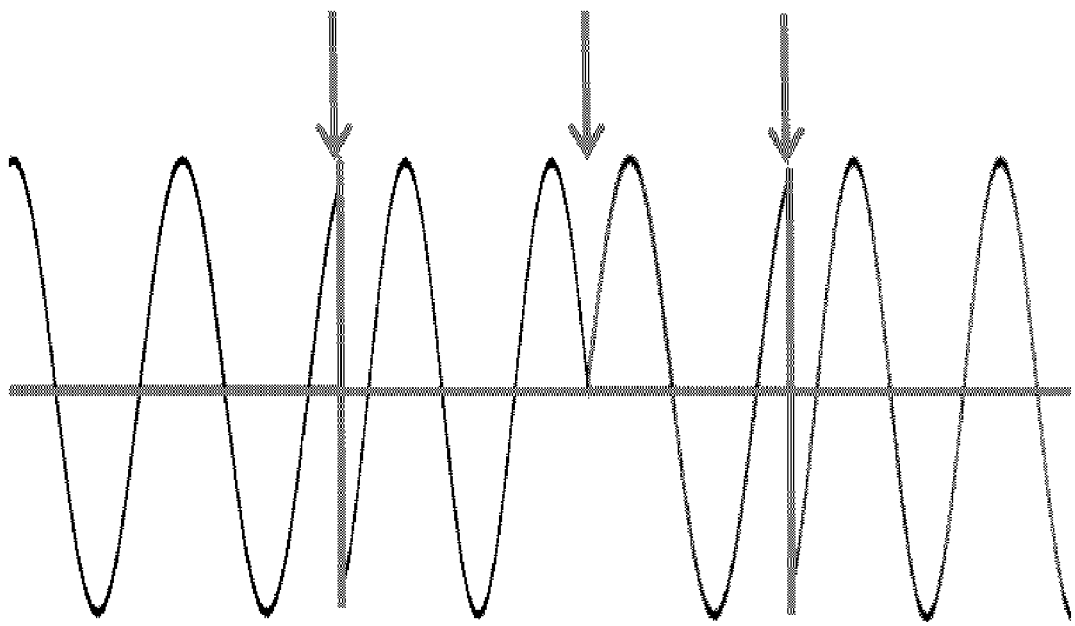
FIG. 1 shows waveform changes of the voltage of a transmission side output stage after a transmission side switching unit executes polarity switching at three positions, wherein at the tree positions indicated by arrows, positive polarities are changed to negative polarities and phases are shifted by 180°.

A large number of exemplary embodiments with various methods and options as will be suggested in the present invention may exist, but among them, a representative exemplary embodiment of the present invention will be proposed below.

A polarity switching power line communication system according to the present invention includes a transmission side, a reception side, and a connection line, and the transmission side receives commercial AC power from a transmission side power source input stage connected to a power source or DC power passing through a battery, Energy Storage System (ESS) or a switching mode power supply (SMPS) for switching the commercial AC power to the DC power. Further, the transmission side acquires information on how a transmission side external interface unit for receiving a communication signal controls the use of a power load connected finally to the reception side and how it controls energy saving. Through the transmission side external interface unit, such as a program or input acquiring device of a cell phone, a personal computer, a tablet, a dedicated terminal, or a dedicated console as a user interface device of a user or management service, a sensor input device for various sensor networks, and the like, accordingly, information on scheduled works desired by a person's intension or automatic program, such as sensed values or work contents interlinked with the sensed values of the sensors is received from the outside.

The connection line generally uses two electric wires, and in the case of three-phase power, the connection line uses three electric wires. The power received from the power source is connected to a transmission side switching unit for performing polarity switching for voltages of the electric wires through a semiconductor device or relay. The transmission side switching unit is an H-bridge circuit or relay circuit controlled generally by an output port of a microcontroller.

If the AC power is used, polarities are periodically reversed, and in the case of negative polarities, as the H-bridge circuit using a unidirectional switching device is operated only on DC voltage, the H-bridge circuit is configured to receive rectified power whose voltage is reversed on the phase interval of the negative voltage to the form of a ripple current passing through a bridge diode circuit or active rectifier located on the front thereof. However, if the H-bridge circuit is configured using a bidirectional switching device with two MOSFETs connected in series, advantageously, a power loss is small like the case where the active rectifier is used.

The transmission side switching unit outputs the polarity switching mapped according to an object ID to be transmitted, data to be transmitted, or a control command to the output port of the microcontroller that receives the input of the transmission side external interface unit.

A plurality of reception sides may be connected to the connection line in a multi-drop bus structure, and each reception side manages an ID for identifying a power load for identifying or managing the reception side. As the power is supplied to the connection line, the power is changed to DC to allow the reception side to utilize the DC as the power of a DC circuit like the microcontroller, and a polarity switching pattern is restored and supplied as DC power or AC power to a load. In the case of AC, the restoration of the polarity switching pattern makes an output phase-shifted to 180° again. This utilizes the bridge diode circuit or the active rectifier.

The microcontroller on the reception side makes the polarity switching pattern into DC or into the form of being received through an input port thereof. A reception side potential monitoring unit monitors a voltage of the connection line, compares expected potential with currently inputted potential as a change with the preceding period potential, and if a difference therebetween occurs, determines that the transmission side switching unit is operated, so that a reception side analyzing unit performs decoding of the ID and transmission data on the temporal pattern of the switching operation. In this case, a PLL circuit is introduced and interlocked with the microcontroller to recognize the switching pattern. The functions of the reception side analyzing unit or the reception side potential monitoring unit are shared in the microcontroller.

As the analyzed result of the reception side analyzing unit, if the ID of the polarity switching pattern is the ID of the reception side analyzing unit, the reception side analyzing unit turns on/off and freely controls the load connected thereto according to the decoded transmission data or control command. Even in this case, if the load which is controllable by communication and manageable by means of pulse width modulation (PWM) through the output port of the microcontroller or other various connectors directly connected thereto is an electrical machine or information electronic appliance, it can be controlled by universal asynchronous receiver-transmitter (UART) communication, remote control bridging, and other wired and wireless communication. In the case of an air conditioner, for example, the reception side transmits control target temperature information via all kinds of wired and wireless communication reception modules including a remote controller that are connected to the air conditioner. Of course, the connection line is connected to the power supply of the air conditioner, and otherwise, the reception side of the present invention is built in the power supply of the air conditioner, so that the microcontroller of the reception side may perform the communication with the microcontroller of the air conditioner.

This is just one exemplary embodiment of the present invention.

MODE FOR INVENTION

The present invention relates to a power line control communication system that transmits power and data or control command from a transmission side to a reception side on a single line. The system includes a power source, the transmission side, the reception side, and a connection line, and a power load used is connected to the reception side.

The power load used is an electric machine as a power load that requires high power and is used to obtain a user's conveniences, such as a lamp, a motor, an actuator, a heater, an air conditioner, a household appliance, an information device, a computer, and the like, as well as an LED used as an indicator for indicating a communication state on the reception side or an operating state of the reception side.

The power source is an AC or DC power source, supplied to the transmission side through a transmission side power source input stage as a component of the transmission side, and used as load power of the power load used connected to the reception side after transmitted to the reception side via the connection line, and some of the power source is supplied as power for a circuit of the reception side.

The transmission side and the reception side are connected to each other through the connection line, and one or more reception sides may be connected on one line in a multi-drop bus structure or tree topology structure so that they may receive power and data.

The reception side issues the ID identifying the corresponding reception side or identifying the power load used connected to the corresponding reception side and includes a reception side ID input unit for receiving the ID. The ID is stored in the reception side ID input unit or a non-volatile memory of a microcontroller connected to the reception side ID input unit. When the transmission side transmits data, the data as well as the ID information of the target reception side or the power load used on the reception side is transmitted to the reception side via the connection line, and the reception side utilizes the data corresponding to its own ID or the ID of the power load used that is managed thereby as its own data or for the control of the power load used connected thereto.

The transmission side includes a transmission side power source input stage connected to the power source, a transmission side output stage connected to the connection line to transmit the power, a transmission side external interface unit for receiving control or data with ID as communication/control signal required to the reception side, a transmission side switching unit for performing switching on waveforms of an electrical voltage of the transmission side output stage to execute electrical voltage waveform changes related to the ID or data value, and a transmission side switching control unit for controlling the transmission side switching unit in accordance with the ID or communication data.

If the power source is AC, it has a sinusoidal voltage of frequency 50/60 Hz and a zero-crossing phase time point two times per one period. As a voltage around the zero-crossing point is low, a signal value becomes low, and accordingly, if the communication is performed using the signal on the phase interval around the zero-crossing point, the voltage is low so that a signal hard to be distinguished appears on the reception side. The transmission side further includes a transmission side phase detecting unit for recognizing zero-crossing, peak, or specific phase time point so as to transmit a signal in the phase interval from which the zero-crossing point is avoided. The transmission side power source input stage and the transmission side output stage are components for connecting the power source to the inside and outside of the transmission side.

The term "polarity" has been defined in the above, and also, the term "polarity switching" has been defined in the above. The polarity switching is executed to change directions of electric current so that a positive polarity of a terminal voltage is switched to a negative polarity thereof and a negative polarity thereof to a positive polarity thereof. If the power source is AC, the polarity switching is executed through phase shift to 180°, which is shown in FIG. 1.

In the case of the existing phase angle control AC power line communication system, an interval where power disconnection occurs on the phase interval around the zero-crossing point may be generated, but through the polarity switching, the polarities are just reversed. Accordingly, if the rectification is applied, the power is restored so that the polarity switching can be executed even at the phase time point of the peak value, without being limited to the phase interval in the range of a low level signal around the zero-crossing point. Moreover, the polarity switching may be executed several times in the range allowed by the accumulation value of short energy disconnection time periods caused by the slew rate within one period, while being not synchronized with the two-time zero-crossing time points of the sine wave per one period, and accordingly, when compared with the existing phase angle control AC power line communication system, the system according to the present invention can perform high speed communication and use a high voltage phase interval as a signal phase interval to provide high reliable communication with a very high signal level.

Figure 2:
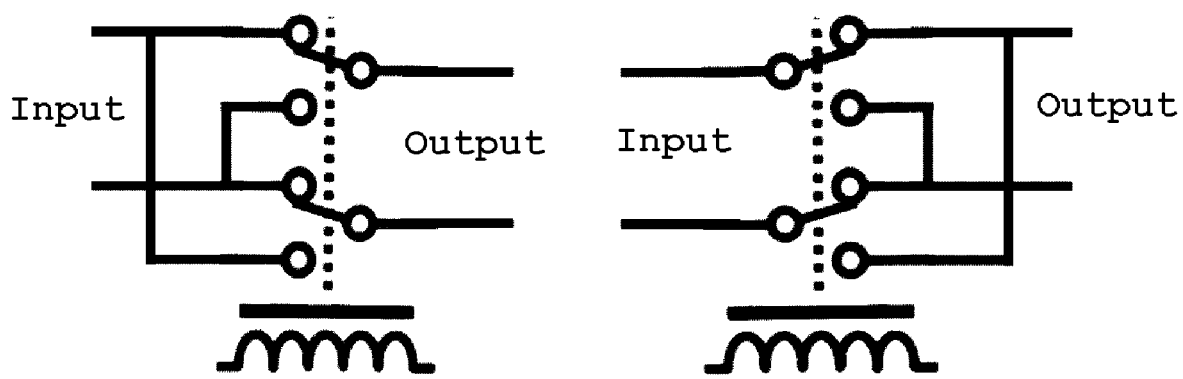
FIG. 2 shows a relay circuit with a Dual Pole Dual Throw (DPDT) switch that most simply constitutes the transmission side switching unit for executing polarity switching.

A transmission side component for executing the polarity switching is the transmission side switching unit. The transmission side switching unit is constituted of a relay or power semiconductor device. It is the most simple that using a single relay, the polarity switching is conducted, and as shown in FIG. 2, a relay having a double pole double throw (DPDT) switch is provided to execute the polarity switching. Otherwise, four single pole single throw (SPST) switches or two single pole double throw (SPDT) switches may be configured to provide the functions of the single relay with the DPDT switch. If the transmission side switching unit is provided using a relay with the switch driven mechanically, a period of time over a given value is consumed in the switching to cause a time interval in which energy is not transmitted to the output side. However, as shown in FIG. 1, the polarity switching can be executed at low communication speed over several periods for a long time.

Generally, the relay is bulky, requires large driving power, and generates noise. Further, the lifespan of the relay is dependent upon a switch material, and the switching speed thereof is slow to cause long disconnection time in the power transmission to the reception side. However, advantageously, the electrical resistance of the switch is low to provide high power transmission efficiency and the polarity switching is executed in a simple and economical manner. If it is desired to execute fast polarity switching, the relay may be replaced with other means like a power semiconductor device.

To protect the switch of the relay, desirably, the switching has to be executed correspondingly to the zero-crossing time point when the power energy is transmitted to the minimum to thus cause arcs generated by the counter electromotive force produced upon the switching of an induction component like the coil of a line or load to be minimized.

Figure 3:
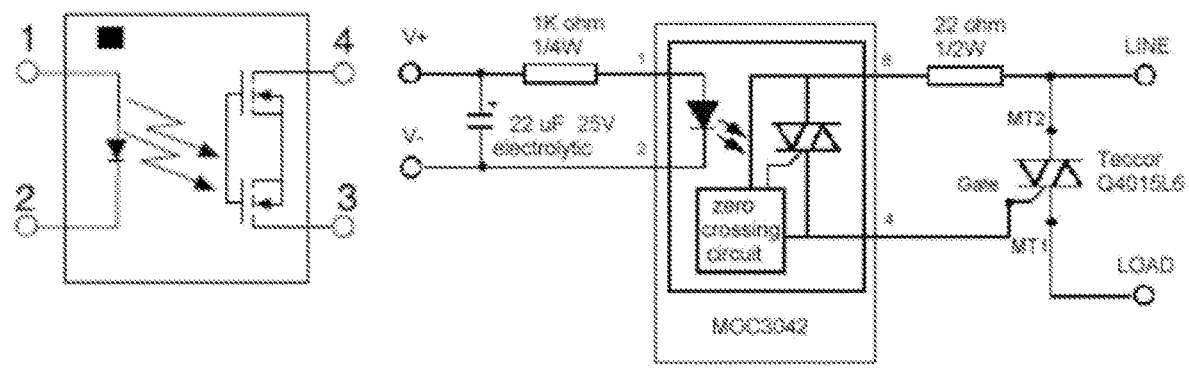
FIG. 3 shows a Solid-State Relay (SSR) and a PhotoTriac as examples of an optical isolation bidirectional switching device available in the transmission side switching unit.
Figure 4:
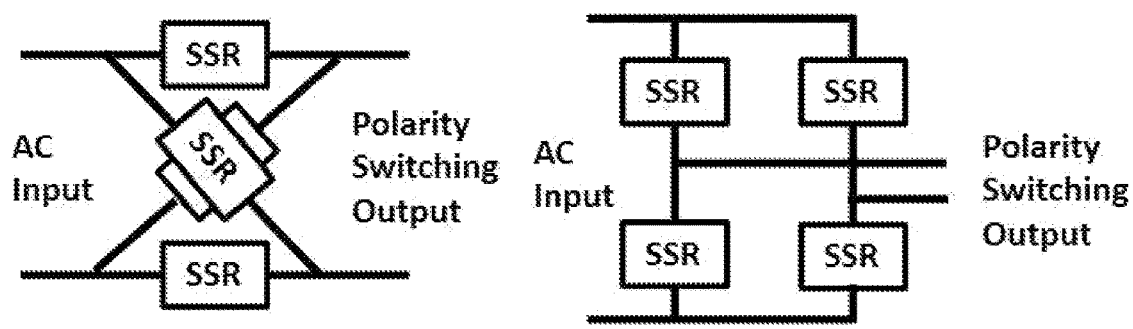
FIG. 4 shows the SSRs as bidirectional switching devices as an example of the transmission side switching unit whose power source is AC, wherein the SSRs are connected to the shape of X or H-bridge.

Further, the transmission side switching unit may be configured to have an H-bridge circuit formed of a semiconductor or relay like a dual MOSFET cascade made by connecting a solid state relay (SSR), a Triac, or two MOSFETs through a cascade (See FIGS. 3 and 4). Further, the transmission side switching unit makes the use of an optical coupling device as shown in FIG. 3 to provide an SSR or Phototriac having an insulation function, and the transmission side switching unit is configured to have the relay with the DPDT switch alone (See FIG. 2).

Figure 5A:
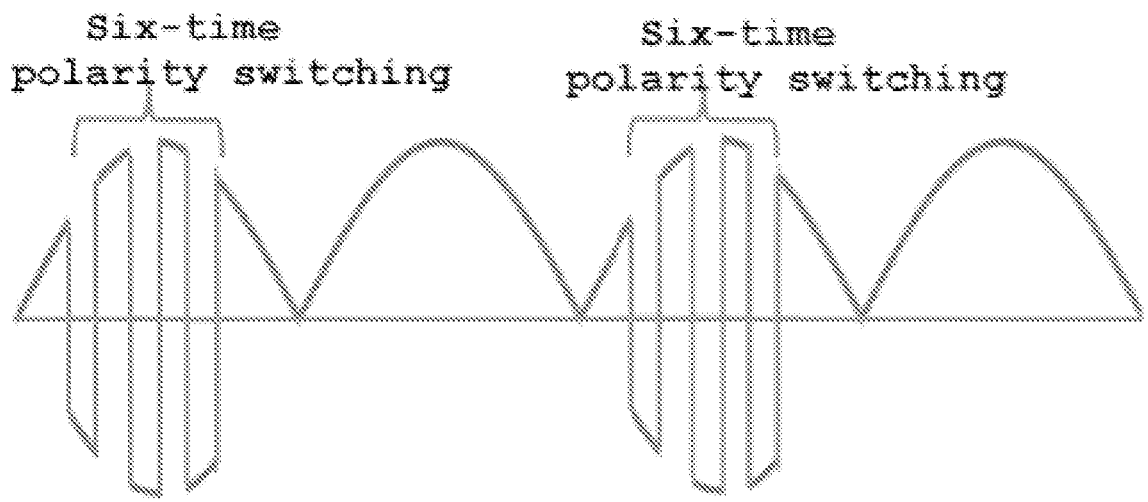
Figure 5B:
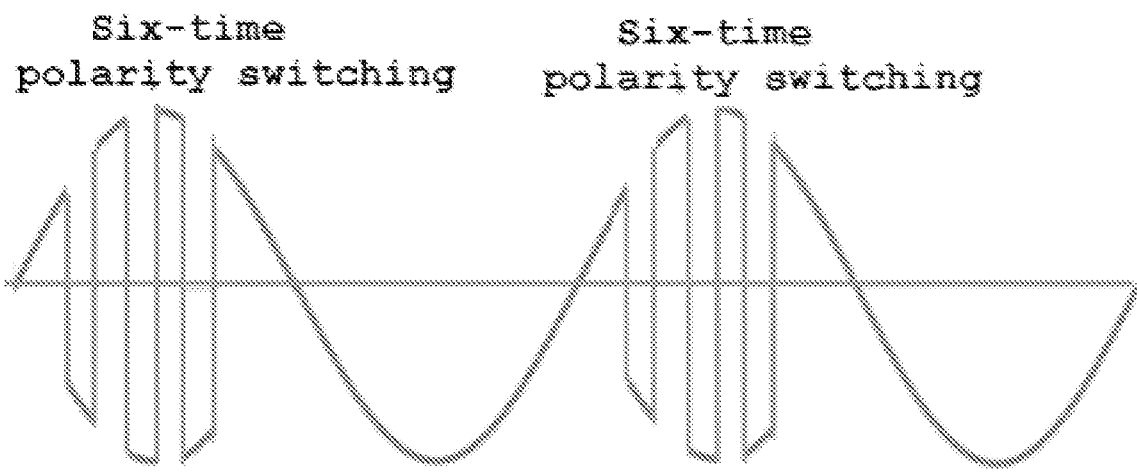

If four bidirectional switching devices are used, they may be arranged in the shape of X or H, as shown in FIG. 4, and since they have the same circuit as each other, they are all called H-bridge circuits. In the case of the use of the four bidirectional switching devices, over current may flow to an undesired path due to wrong control of the switching devices, and accordingly, a lot of attention has to be paid. If the H-bridge circuit is used, like this, fast polarity switching can be executed on the waveforms of the AC, as shown in FIGS. 5A and 5B. FIG. 4 is an exemplary diagram showing the transmission side switching unit executing the polarity switching that is provided with the H-bridge circuit configured with the SSRs as four bidirectional switching devices.

It is possible that the transmission side switching unit is configured using the power semiconductor device of the unidirectional switching device conducting electric current only in one direction, such as a transistor, a MOSFET, an SCR, or an IGBT.

As shown in FIG. 6, in the case of using the IGBT switching device and three-phase AC input, the transmission side switching unit is configured to have an H-bridge circuit constituted of four semiconductor switching devices located on the output stage thereof. Since only a DC can be used as the power source of the H-bridge circuit using the transistor, MOSFET, IGBT, or SCR as the unidirectional switching device, a rectifying means has to be disposed in front of the H-bridge circuit to convert the AC into the DC.

If the power source is AC and the device of the transmission side switching unit is the unidirectional switching device, a rectifying means, which ensures that one side terminal of the transmission side switching unit is higher in potential than the other side terminal, is a transmission side waveform rectifying unit.

The transmission side waveform rectifying unit is a kind of a rectifying circuit for reversing a voltage on the phase interval of the negative polarity of the AC input voltage, and various rectifying circuits such as a bridge diode circuit, an active rectifier, and the like may be served as the transmission side waveform rectifying unit.

FIG. 6 shows an example where the gates of six IGBT devices are controlled with respect to three-phase AC inputs to thus produce a rectified ripple waveform, and next, the ripple waveform is inputted to the transmission side switching unit. The potential of one terminal of the transmission side switching unit is always equal to or greater than that of the other terminal, and four IGBT gates constituting the transmission side switching unit are controlled to produce the waveform with the polarity switching as shown in FIGS. 5A and 5B.

If the three-phase AC inputs pass through the transmission side waveform rectifying unit, they become the ripple waveform where a DC voltage greater than a given voltage always exists unlike a single phase AC, it is possible to execute the polarity switching irrespective of the phase of the AC voltage.

Even in the case of using the single phase AC power, like a circuit configuration as shown in FIG. 7, inductors are connected in series between the active rectifier and the H-bridge circuit, and otherwise, capacitors are connected in parallel therebetween, to additionally provide a smoothing circuit where a voltage greater than a given level always remains, so that like the three-phase AC inputs, there is no restriction in time when the polarity switching output of the H-bridge circuit is generated.

FIGS. 5A and 5B have different waveforms from each other, but they show that the polarity switching can be executed using the semiconductor switching device. As the number of times used for a given semiconductor switching device located on the transmission side switching unit becomes increased, a device having a small power capacity can be used as the device conducting electric current onto the phase interval of the negative polarity. In the case where the waveform of commercial AC voltage is required, like a single phase induction motor on a load side, power control is desirably performed to output a polarity switching signal on the AC, as shown in FIG. 5B.

FIG. 7 shows an example where a circuit related to the power source is built between the active rectifier circuit and the H-bridge circuit to improve the functions of the circuits. If the smoothing circuit connecting the serial inductors or parallel capacitors as mentioned above is adopted, the smoothing circuit serves to make the signal smooth so that the polarity switching through the H-bridge circuit is always executed at a higher voltage greater than a given level, thereby increasing communication speed.

Figure 8:
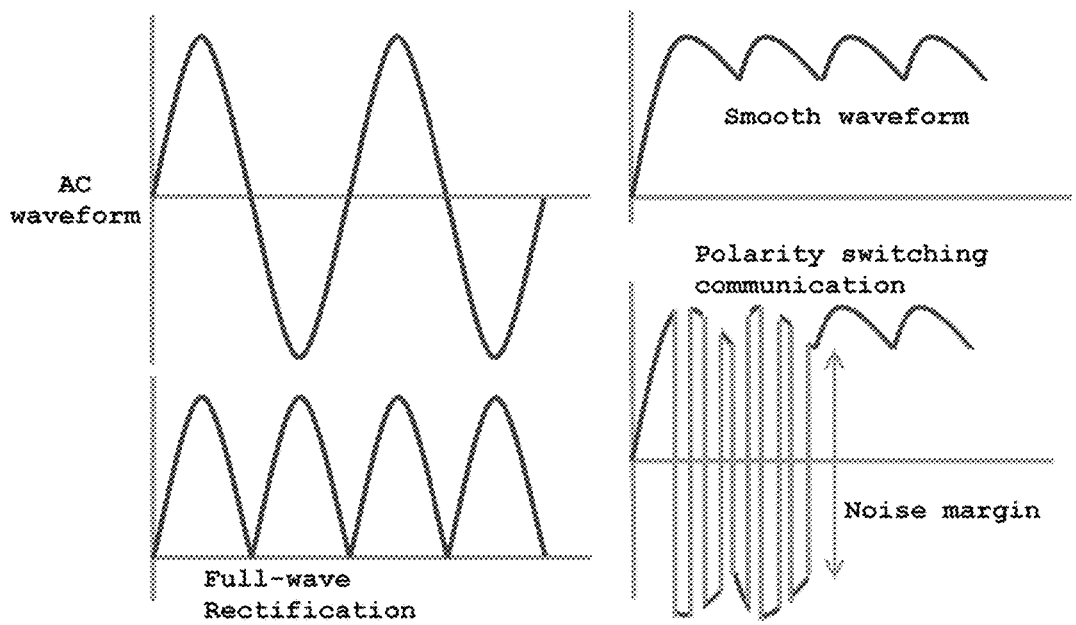
FIG. 8 shows the polarity switching waveforms by communication on the ripple current outputs if a power source is AC and the transmission side switching unit executes the switching operation after the power source passes through the full wave rectification and the smoothing circuit.

FIG. 8 shows an example where in the case of the single phase AC, the smoothing circuit is provided to generate communication waveforms produced through the polarity switching of the ripple currents corresponding to the DC whose ripples are large. In this case, as a given level of voltage exists like the three-phase AC, the polarity switching can be always executed irrespective of the zero-crossing point of the AC, thereby achieving fast communication speed.

If a voltage conversion circuit such as a buck converter (step-down converter) is used, a voltage similar to or lower than a voltage used in a power load used is generated, and further, a power source element necessary every final reception side circuit is reduced just to one voltage conversion element on the transmission side, thereby providing economical advantages.

If a high voltage is required every load or the connection line is long to generate large power loss due to impedance occurring thereon, a boost module is activated to provide a high-voltage and high-impedance power environment, and if the high voltage is lowered to a voltage used by the load on the reception side, power attenuation can be reduced in controlling long distance power line communication.

The control for the gates of the devices, the bases of the transistors, or the input terminals of the relays of the transmission side switching unit of the transmission side is performed by an electrical signal received from the output of the microcontroller or dedicated circuit logic of the transmission side or from the outside, so that the switching operation of the transmission side switching unit can be executed. A means for controlling the transmission side switching unit is defined as a transmission side switching control unit (See FIG. 9).

The transmission side switching control unit controls the transmission side switching unit to allow the polarity switching pattern to be made in accordance with the protocol for the ID or transmission data of a reception object in the communication. The protocol for mapping two-bit data on the temporal pattern of the polarity switching is pre-set. On the reception side, also, the ID and data on the voltage waveform of the electricity transmitted according to the protocol are decoded.

Figure 9:
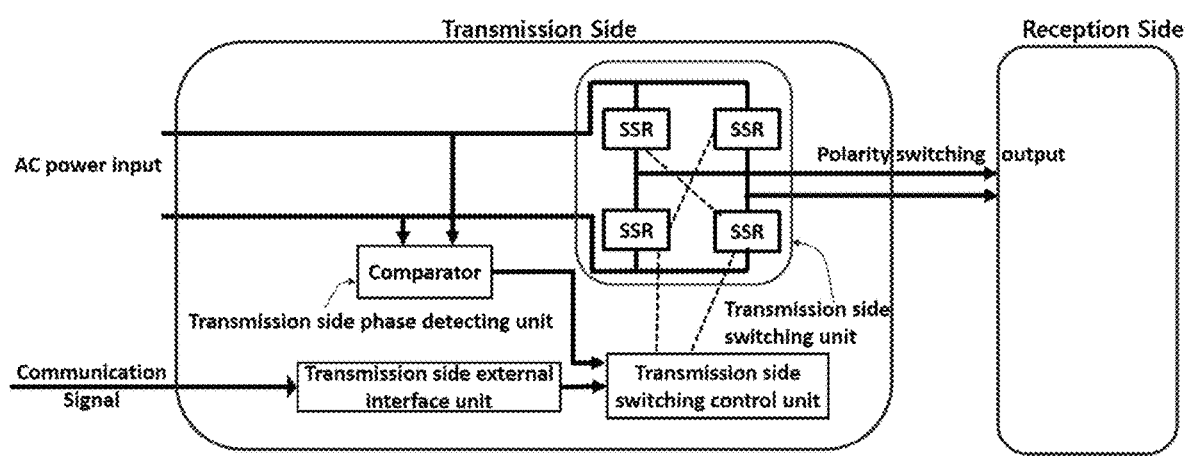
FIG. 9 shows a transmission side driving unit (transmission side switching control unit) that avoids zero-crossing points to allow the transmission side switching unit to execute the polarity switching when a power source is a single phase AC power source, wherein the transmission side switching unit has four SSRs, and through a comparator, a specific phase of the AC power is found to execute the switching operation, while avoiding the zero-crossing points.

The control operation of the transmission side switching control unit is performed under the intention of the final user, management service, or remote system to perform the communication with the specific reception side object or controlling the reception side load, and accordingly, the transmission side switching control unit may further include a connection to a transmission side external interface unit for receiving the external signal of the final user, management service, or remote system or transmitting information to the outside (See FIG. 9). The communication between the transmission side external interface unit and the outside is performed through a directly controllable switch and wiredly or wirelessly. In specific, the communication is performed simply through an infrared optical signal of a remote controller, and various wired communication such as RS-232, RS-485 and various wireless communication such as ZigBee, Z-Wave, LoRa, NB-IoT, SigFox, Wi-Fi, Bluetooth, and the like may be possible. Of course, the outside communication is not limited thereto. The other part may be the user who directly uses the outside communication or a person or computer system in a remote central management service. Further, the other part may be a remote computer system connected to internet network or a user who accesses to the system or may be a gateway for connection. Further, the transmission side external interface unit may be connected with an interface for accepting the vertical service of open IoT platform such as OneM2M, OCF, and the like. The transmission side external interface unit may be interlocked with TCP/IP or the open IoT platform of other vertical service, with KNX used as a building automation and control platform, or with LonWorks platform as home networking middleware. The transmission side external interface unit may be connected to other various platforms as not mentioned above, thereby performing the outside communication.

Further, the transmission side external interface unit may receive various sensor values from a light sensor or passive infrared sensor directly or through the above-mentioned various communication and thus control the output. The transmission side further includes a transmission side phase detecting unit. When the power source is AC, it is a low voltage around the zero-crossing time points occurring two times per period, and if the polarity switching is executed on the phase interval, the signal voltage becomes low and the communication becomes weak in external noise. Contrarily, if the polarity switching is executed through the relay, it is important that the switching is performed at the zero-crossing time point so as to solve the energy disconnection problem and to protect the relay switch. Accordingly, it is desirable that the zero-crossing phase time point, the peak value phase time point, or the specific phase time point is found to execute the polarity switching at the phase time point appropriately found. The transmission side phase detecting unit serves to check a voltage value every AC phase so as to find an appropriate time for the polarity switching to allow the transmission side switching control unit to execute the polarity switching at the appropriate phase time point. As shown in FIG. 9, a comparator, which monitors both input terminals of AC power, serves as the transmission side phase detecting unit.

Figure 13:
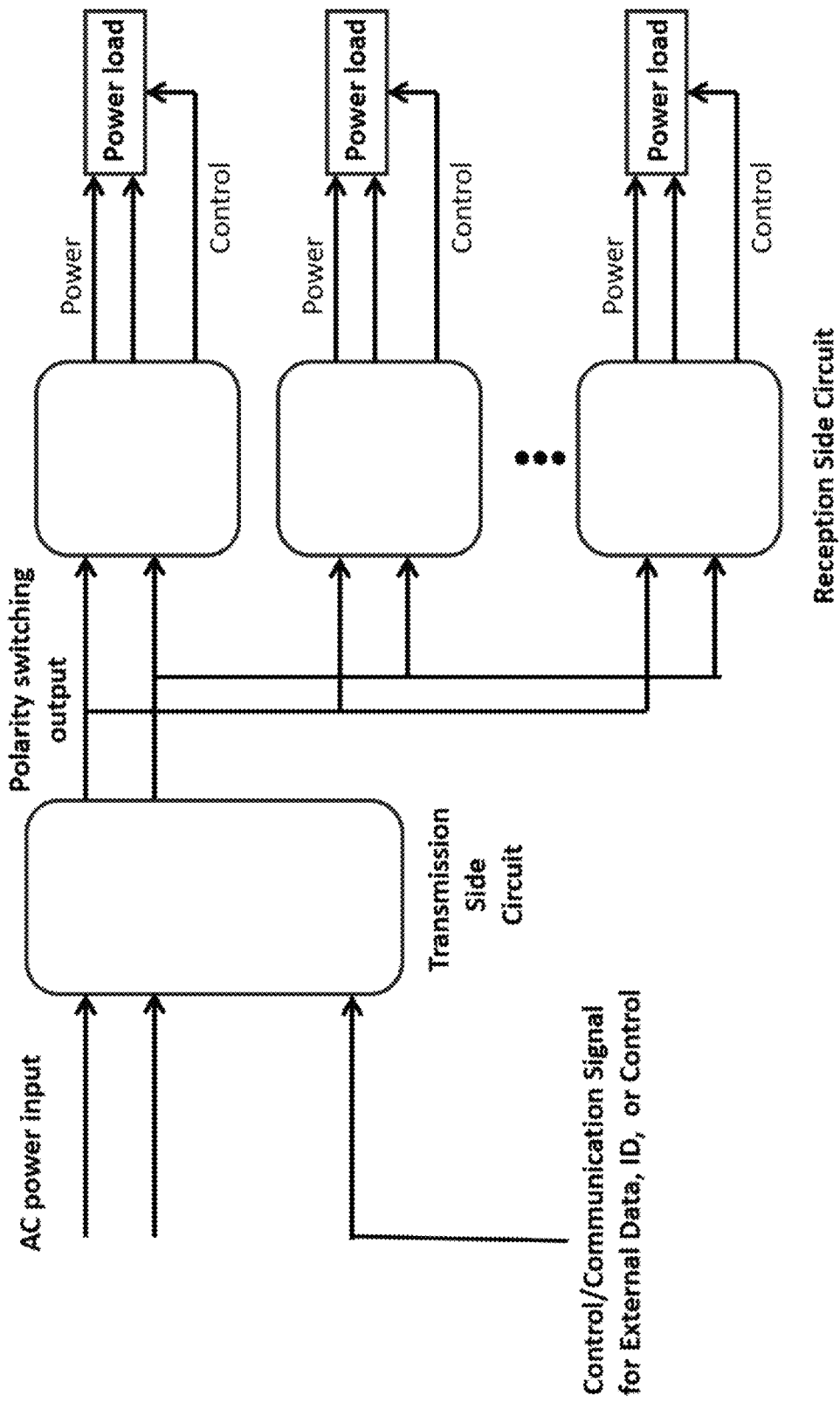
FIG. 13 shows the connectivity of one transmission side circuit to multiple reception side circuits with each own power load under the muti-drop bus.

The reception side is connected to the transmission side through the connection line. A plurality of reception side units may be electrically connected under the multi-drop bus or tree structure, and the reception side is connected to the power load used (See FIG. 13). Of course, a plurality of power loads used may be connected to one reception side. Some of the AC power or DC power transmitted to the reception side through the connection line is used as the load power for the power load used, and the rest of the power is used as the circuit power of the reception side. FIG. 13 shows the connectivity of one transmission side circuit to multiple reception side circuits with each own power load under the muti-drop bus.

In specific, ID is applied to the power loads used connected to the respective reception sides or to the power load used connected to the reception side, and the reception side includes a reception side ID input unit for receiving the ID. The reception side ID input unit may have a means for storing the ID, and otherwise, the microcontroller used may have the means for storing the ID as an internal non-volatile memory. An ID system includes broadcasting ID representing all of the reception sides and group ID for grouping the power loads used for the specific reception side or the reception side, and in the power line communication, the ID and the data or control command to be transmitted to the reception side having the ID are mapped on the voltage waveform and thus transmitted through the polarity switching. The reception side decodes the ID and data in a series polarity switching pattern. The decoding is executed by the microcontroller of the reception side, which is defined as a reception side analyzing unit. The reception side analyzing unit shares the same protocol as the transmission side switching control unit of the transmission side and finds the ID and data transmitted on the voltage waveform of the transmitted power onto which the polarity switching is reflected. Desirably, efficiently, a dedicated microcontroller including surrounding circuits or a dedicated IC having such functions embedded therein performs the above-mentioned functions.

Figure 10:
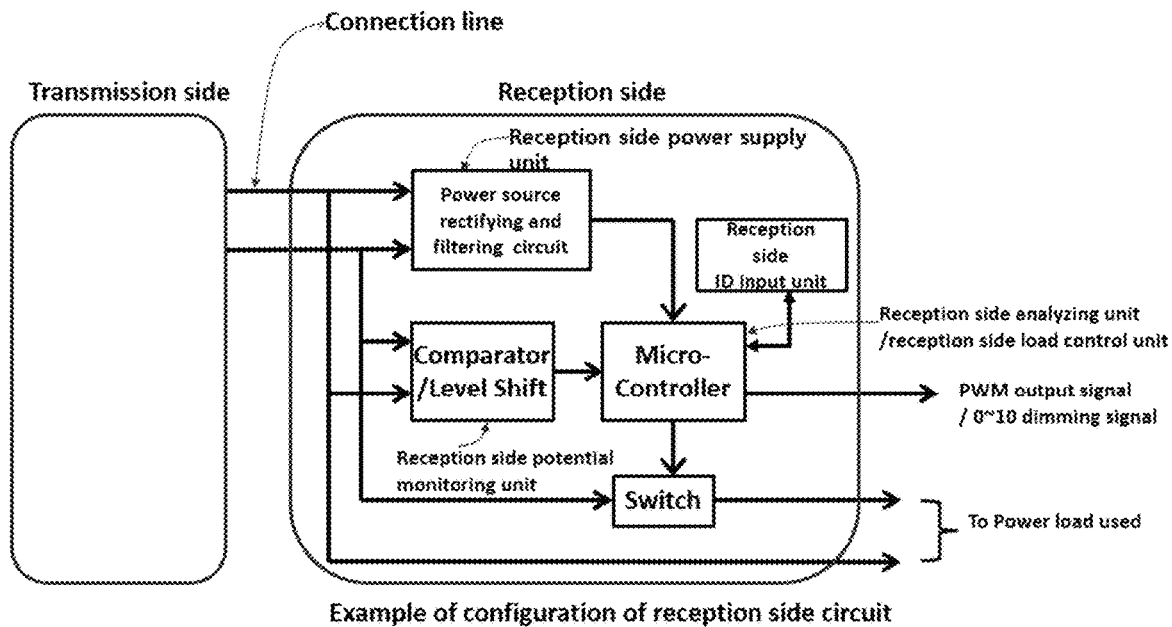
FIG. 10 shows an example of a reception side where a power source rectifying and filtering circuit serves as a reception side power supply circuit, a comparator/level shifter as a reception side potential monitoring unit, and a microcontroller as a reception side analyzing unit and a reception side load control unit, wherein a power load used is controlled by a switch or with a 0 to 10 V dimming signal or PWM output signal.
Figure 11:
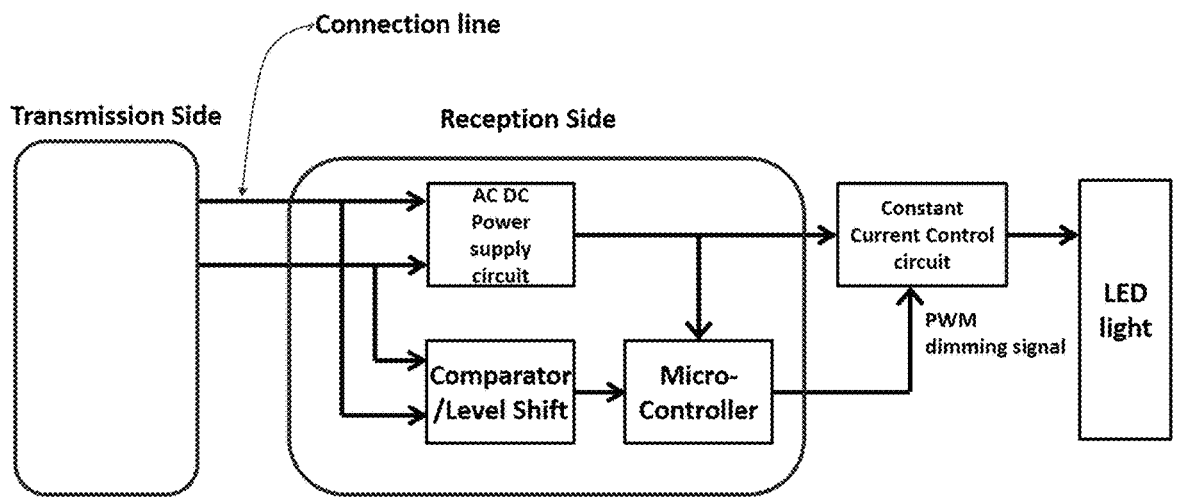
FIG. 11 shows an example where a power source is AC, DC power as constant current is supplied to an LED light load through AD/DC power supply circuits, and PWM dimming control is executed.

FIGS. 10 and 11 show examples of the reception side. Regardless of whether the power transmitted through the connection line is AC or DC, the microcontroller of the reception side analyzing unit requires a DC drive power source, and accordingly, if the power is AC, the AC has to be converted into the DC power source to a level available in the microcontroller. Even in the case where the power is DC, the DC has to be changed to an appropriate voltage level, and if the polarity switching is included therein, the rectifying function for restoring the polarity switching is required to cause no power source supply problem of the microcontroller. The above-mentioned functions are performed by means of a reception side power supply circuit unit. The reception side power supply circuit unit includes circuits for performing half or full wave rectification, smoothing, and conversion into an appropriate voltage. The reception side power supply circuit unit may be removed according to situations, and instead of the reception side power supply circuit unit, an external power source may be transmitted and used. Generally, the external power source is supplied from a circuit receiving a PWM signal or 0 to 10 V or 1 to 10 V dimming signal.

In addition to the reception side analyzing unit, the reception side power supply circuit unit produces and supplies additional various circuit power sources such as a power source for operating indicator LED devices for indicating communication states or a DC power source for a switch for ID inputting and LED indicator devices.

It is necessary that the reception side performs the supply of power as well as finds the ID and communication data transmitted thereto. In this case, the reception side includes a reception side potential monitoring unit located in front of the reception side power supply circuit unit to analyze the voltage waveform on which the polarity switching pattern remains and to perform shifting to the level analyzable. As a result, the ID and data as the output of the reception side potential monitoring unit is decoded by the reception side analyzing unit as the microcontroller or the dedicated circuit.

A comparator/level shifter as shown in FIG. 10 serves as the reception side potential monitoring unit. The reception side potential monitoring unit serves to sense whether the polarity switching occurs on the voltage waveform transmitted to transmit the sensed signal as a logic signal to the microcontroller or the dedicated circuit as the reception side analyzing unit.

If the power transmitted is AC, 50/60 Hz periodical sinusoidal or ripple waveform appears on the connection line. The reception side potential monitoring unit monitors a voltage of the connection line, compares expected potential with currently inputted potential as a change with the preceding period potential, and if a difference therebetween occurs, determines that the transmission side switching unit is operated, so that the reception side analyzing unit performs decoding of the ID and transmission data on the temporal pattern of the switching operation.

Figure 12:
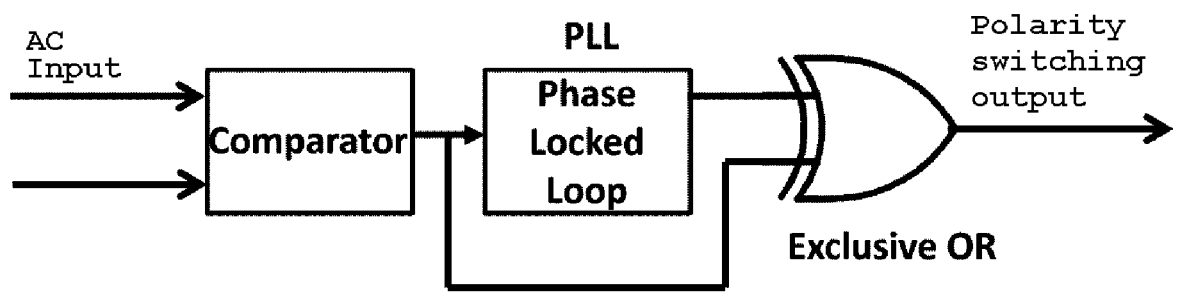
FIG. 12 shows the PLL as an example wherein if a power source is AC, a circuit for sensing the switching operation of the transmission side switching unit has a hardware configuration on the reception side.

FIG. 12 shows an example of a hardware configuration for sensing the polarity switching. If a logic circuit having a comparator, phase locked loop (PLL), and an exclusive OR gate is provided, the signal received from the transmission side can be easily decoded. In this case, if the AC waveform received from the transmission side is made into an imaginary waveform with phase corresponding thereto through the PLL, an imaginary signal whose period and phase angle are same as each other is made, but due to the internal delay element of the PLL, even though the polarities of short periods of signals are switched, the switched results are not reflected onto the output of the PLL, so that repeated and regular waveform is outputted. Accordingly, if the waveform is compared with the inputted signal through the exclusive OR logic gate circuit or the comparator, the transmission side can detect the polarity switching of the transmission side switching unit, and the reception side analyzing unit as the microcontroller can decode the transmitted ID and data in the detected series polarity switching.

If the power transmitted is DC, moreover, the polarity switching pattern of the connection line is level-shifted and more easily recognized by the reception side microcontroller.

The detection of the transmission side polarity switching through the hardware configuration including the PLL has been explained, and also, the detection may be performed by the microcontroller as an example of a real application circuit. If the signal of the connection line is transmitted to one digital input port through the level shifting, the AC power with no polarity switching is inputted as the 50/60 Hz sinusoidal signal, and the microcontroller memorizes the periodically repeated pattern of the input signal, produces the imaginary signal synchronized with the pattern from the interior thereof, and compares the imaginary signal with the current port input, so that the occurrence of the polarity switching can be recognized by the reception side.

If the polarity switching does not occur on the AC power, the signal corresponding to the 50/60 Hz sinusoidal wave is continuously inputted, and if it is checked that a shorter signal than the signal is inputted, it is determined that the polarity switching is executed at the corresponding time point.

The polarity switching is executed only on the phase interval of high AC voltage, and desirably, the signal is distinguished even on the reception side disposed at a long distance. In the state where the signal corresponding to the 50/60 Hz sinusoidal wave is continuously inputted, the middle portion having a given margin at the zero-crossing phases of 0° and 180° as the increasing and decreasing time points of the 50/60 Hz sinusoidal wave is at the moment when the AC potential is the highest, and if the change in the sinusoidal waveform in the phase interval is sensed, the transmission side determines that the change is the execution of the polarity switching for communication.

To detect a large number of polarity switching signals having a short width within one period of the AC power, the comparator is simply used, and the change in the waveform except the periodical 50/60 Hz sinusoidal wave signal can be determined as the polarity switching signal.

The comparator may be configured to have a dedicated IC or differential amplifier using a plurality of transistors.

In the simplest manner, one side signal of the line voltage is inputted to the port of the microcontroller through the voltage divider type level shifting circuit, and since a diode clipping circuit exists on the port of the microcontroller to perform circuit protection, the level shifting can be performed by just one resistor. In this case, the noise margin of the signal falls by half when compared with the comparator, and accordingly, signal-to-noise ratio (S/N ratio) is lowered by 3 dB, so that communication stability is decreased, but advantageously, the circuit may be configured simply.

The reception side includes a reception side power output stage connected to the power load used. The reception side power output stage is directly connected to the power input stage of the power load used, and if the load uses the DC power in the state where the power source is AC, the reception side power output stage is connected to the power load used through a power adapter for converting AC into DC or a DC power supply like a Switching Mode Power Supply (SMPS) and a battery.

The reception side serves to transmit appropriate data to the power load used or to appropriately control the power load used according to the transmitted control command/data. A reception side component having such functions is defined as a reception side power output control unit. Generally, the reception side power output control unit is the microcontroller also having the functions of the reception side analyzing unit.

The reception side power output control unit serves to control the power transmitted to the power load used and the output of the DC power supply connected to the reception side power output stage. In this case, the power transmitted to the power load used is directly controlled by a switch, or 0 to 10 V or 1 to 10 V analog output control signal or PWM digital output control signal is directly transmitted. The above configuration is shown in FIG. 10.

A relay or thyristor such as an SSR, a Triac, and the like as the switch for directly controlling the AC power transmitted to the power load used is provided to directly turn on/off bidirectional power transmitted to the load, and if a separate DC power source is provided, the output is turned on/off or the PWM control is possible using a unidirectional switch such as a transistor, MOSFET, IGBT, and the like.

FIG. 11 shows the example where the power load used is an LED light and the load control is PWM dimming control. In this case, the LED light load adopts constant current type power supply. To control the brightness of the LED light, constant voltage PWM control or constant current control is possible, and AD and DC power supply circuits are provided unitarily with each other. In the case of AC direct-type LED light device put recently in the market, it uses a dedicated IC, and if a circuit having a reception function is embedded in the dedicated IC, the LED light device may be miniaturized economically.

Various power loads for household appliances or information equipment are controlled through the power load used. In the case of an air conditioner, target temperature information is transmitted to the transmission data, and the reception side transmits the data as DC communication to an air conditioner controller through a remote controller or wireless or direct wiring, thereby controlling the temperature.

If the power load used is a single phase induction motor (condenser motor), the AC power on which the polarity switching is repeatedly executed is applied and thus collides with the rotation of the motor, thereby causing the generation of noise. Therefore, a motor having the function of an inverter is used as the power load used. In this case, it is useful that the activation information such as the frequency of the inverter output is transmitted and controlled.

If the power source is DC, for example, the polarity switching is executed two times in the 50/60 Hz period to supply the periodical sinusoidal wave to the connection line.

In this case, a problem, which is occurring when a purely inductive load is connected to the power load used to cause over current to flow due to low impedance and to thus burn the load, can be prevented, and the electrolytic corrosion of the connection line can be suppressed. This may provide a hybrid power source supply system for selectively supplying AC and sinusoidal wave to existing outlet.

INDUSTRIAL APPLICABILITY

According to the present invention, the transmission of the power to the remote power load device from the power source and the transmission of communication data or control command through the connection line can be used for various purposes.

The final power load for the conveniences of peoples in houses, buildings, or public facilities is required for various terminal equipment including a light, a power system using a motor or actuator, a heater, a sensor network, various living appliances such as a refrigerator, a television set, and the like, and an information device like a computer. Various SmartX technologies such as smart homes, smart farms, smart factories, smart cities, and the like have high utilization values in the control of the power supply and use to the terminal load equipment and in the stability and cost of the power line communication.

The final power load may be utilized for the control in using the energy of a smart grid or terminal energy consumption equipment in an energy demand response.

In specific, in the DC power environment or the existing AC power environment where renewable energy is interlocked with the ESS, the DC or AC power line communication type power supply and load control as well as the energy use management control are industrially used for energy saving or user conveniences.

Sequence Listing Free Text

Not applicable

What is claimed is:

1. A polarity switching power line communication system for simultaneously performing power transmission and communication on a single line, the system comprising:
    a transmission side; a reception side; a connection line; and an ID system for identifying a power load or the reception side,
    wherein the transmission side comprises: a transmission side power source input terminal connected to a AC power source; a transmission side external interface unit for receiving external control and communication signals; a transmission side output stage connected to the connection line; a transmission side switching unit for executing polarity switching on the connection line; a transmission side switching control unit for controlling the transmission side switching unit in accordance with ID and transmission data or control command of the reception side; and a transmission side waveform rectifying unit which ensures that one terminal potential of the power source input of the transmission side switching unit should be always higher than or equal to the other terminal potential,
    the connection line connects the transmission side and the reception side in a multi-drop bus or tree structure, and
    the reception side comprises: a reception side ID input unit for receiving ID for identifying the reception side or a power load used connected to the reception side; a reception side potential monitoring unit for monitoring a potential of the connection line; a reception side analyzing unit for analyzing the switching pattern for the potential of the connection line monitored by the reception side potential monitoring unit, decoding the ID and the transmission data, and if the ID corresponds to reception side ID, using the transmission data as reception data to control a user load; a reception side power supply circuit unit wherein the reception side power supply circuit unit extracts direct current (DC) power source from the connection line to allow the DC power source to be used as power of the reception side analyzing unit as well as the circuit unit; a reception side power output stage for supplying the power of the connection line to a DC power supply or the power load used; and a reception side power output control unit for controlling the output power of the reception side power output stage or the DC power supply.

2. The system according to claim 1, wherein the reception side potential monitoring unit monitors the voltage of the connection line, compares expected potential with currently inputted potential as a change with the preceding period potential, and if a difference therebetween occurs, determines that the transmission side switching unit is operated, so that the reception side analyzing unit performs decoding of the ID and the transmission data on the temporal pattern of the switching operation.

3. The system according to claim 1, wherein the transmission side further comprises a transmission side phase detecting unit for detecting a specific phase time point of an AC waveform, so that according to the detection of the transmission side phase detecting unit, a zero-crossing time point is avoided with a given margin, or if the transmission side switching unit is a relay, the zero-crossing time point is selected to operate the transmission side switching unit.

4. The system according to claim 1, wherein the transmission side switching unit is configured to have an H-bridge circuit with bidirectional switching devices that are Solid State Relays (SSRs), Triacs, MOSFET cascades or a single relay with a Double Pole Double Throw (DPDT) switch.

5. The system according to claim 1, wherein the transmission side switching unit is a circuit configured to have a single relay or a plurality of relays with a DPDT switch.

* * * * *